United States Patent
You et al.

(10) Patent No.: US 8,381,261 B2
(45) Date of Patent: Feb. 19, 2013

(54) METHOD FOR SELECTING POLICY DECISION FUNCTIONAL ENTITY IN A RESOURCE AND ADMISSION CONTROL SYSTEM

(75) Inventors: Jianjie You, Shenzhen (CN); Jun Song, Shenzhen (CN); Mo Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 272 days.

(21) Appl. No.: 12/865,130

(22) PCT Filed: May 21, 2008

(86) PCT No.: PCT/CN2008/071025
§ 371 (c)(1),
(2), (4) Date: Jul. 29, 2010

(87) PCT Pub. No.: WO2009/100625
PCT Pub. Date: Aug. 20, 2009

(65) Prior Publication Data
US 2010/0333171 A1    Dec. 30, 2010

(30) Foreign Application Priority Data

Jan. 30, 2008   (CN) .......................... 2008 1 0004772

(51) Int. Cl.
*G06F 21/00*   (2006.01)
(52) U.S. Cl. ............... 726/1; 709/226; 709/223; 726/21
(58) Field of Classification Search .................. None
See application file for complete search history.

(56) References Cited

U.S. PATENT DOCUMENTS

| | | | |
|---|---|---|---|
| 2005/0238002 A1 | 10/2005 | Rasanen | |
| 2007/0162599 A1 | 7/2007 | Nguyen | |

FOREIGN PATENT DOCUMENTS

CN    1998182 A    7/2007

(Continued)

OTHER PUBLICATIONS

Resource and admission control functions in Next Generation Networks Y.2111 Jun. 1, 2006, ITU-T series Y, XP008133354.*

(Continued)

*Primary Examiner* — Fikremariam A Yalew
(74) *Attorney, Agent, or Firm* — Oppedahl Patent Law Firm LLC

(57) ABSTRACT

The present invention discloses a method for selecting policy decision functional entity in the Resource and Admission Control System. The method includes that: for resource and admission control in the PULL mode, after the Transport Resource Control Function Entity (TRC-FE) receives a resource request message from the Customer Premises Equipment (CPE) or after the Policy Enforcement Function Entity (PE-FE) receives a transport layer signaling sent by CPE, if the TRC-FE or PE-FE is interacting with more than one Policy Decision Functional Entities (PD-FEs), the TRC-FE or the PE-FE may select a PD-FE according to the stored identification information of PD-FE or statically configured PD-FE, and send a resource decision request message to the selected PD-FE. With the application of the present invention, in resource and admission control in the PULL mode, after receiving the resource request initiated by CPE through the transport layer signaling message, the TRC-FE or PE-FE may select the exact PD-FE to implement the resource reservation process, thereby resolving the problem in prior art that during the resource and admission control process the TRC-FE or PE-FE can not select the exact PD-FE to send resource decision requests.

7 Claims, 4 Drawing Sheets

FOREIGN PATENT DOCUMENTS

CN 101031140 A 9/2007
CN 101222432 A 7/2008

OTHER PUBLICATIONS

International Search Report in international application No. PCT/CN2008/071025, mailed Sep. 4, 2008.
English Translation of the Written Opinion of the International Search Authority in international application No. PCT/CN2008/071025, mailed Sep. 4, 2008.
Resource and Admission Control Functions in Next Generation Networks Y-2111.
Resource and Admission Control in NGN.
Supplementary European Search Report in european application No. 08748631.2, mailed Mar. 9, 2011.
Notification of the First Office Action of Chinese application No. 200810004772.7, issued on May 25, 2011.

* cited by examiner

METHOD FOR SELECTING POLICY DECISION FUNCTIONAL ENTITY IN A RESOURCE AND ADMISSION CONTROL SYSTEM

TECHNICAL FIELD

The present invention relates to the field of communications, and more specifically to a method for selecting policy decision functional entity in a resource and admission control system.

BACKGROUND

As a hot-spot research subject in today's communication standardization field, NGN (Next Generation Network) adopts packet technologies including IP (Internet Protocol), etc, as the carrier network technology to converge fixed communication and mobile communication. NGN can provide more abundant multimedia services, including emerging services with real time requirements such as VoIP (Voice over IP), video conferencing, remote multimedia teaching and video on demand, etc, these services require the communication network to provide highly efficient end-to-end Quality of Service support; at the same time, users' requirements on the network Quality of Service (QoS) are also becoming increasingly demanding. Therefore, how to provide end-to-end QoS may be one of the core issues in NGN.

The ITU-T (International Telecommunication Union-Telecom) has proposed RACF (Resource and Admission Control Functions) to solve QoS problems in NGN carrier networks. The latest draft of RACF that ITU-T announced in April 2007 offers a functional architecture for RACF, as shown in FIG. 1. The RACF is comprised of two parts: a Policy Decision Functional Entity (PD-FE) and a Transport Resource Control Functional Entity (TRC-FE).

The PD-FE is independent of the transmission technology, and is also independent of Service Control Functions (SCF). The PD-FE makes a final decision for network resource and admission control based on the network policy rules, the service information provided by the SCF, the transport layer subscription information provided by Network Attachment Control Functions (NACF) as well as the resource and admission decision result provided by TRC-FE. The PD-FE performs gate control on the PE-FE based on each stream, and utilizes the policy rules based on services.

The TRC-FE is independent of services, but is dependent on the transmission technology. The TRC-FE is responsible for collecting and maintaining the topology and resource status information of the transport network, controlling the utilization of the resource based on topology, connectivity, the availability of network and node resource, as well as network information such as transport layer subscription information in the access network, and performing admission control for the transport network. Through the Rt reference point, the PD-FE requests the TRC-FE to detect or decide the QoS resource on the requested media flow path.

The transport functional entity is comprised of a Policy Enforcement Functional Entity (PE-FE) and a Transport Resource Enforcement Functional Entity (TRE-FE). The PE-FE is a packet-to-packet gateway which can be located between a Customer Premises Equipment (CPE) and the access network, between the access network and the core network or between networks of different operators, and is the key node to support dynamic QoS control, port address translation control and Network Address Translator (NAT) traversing.

The PD-FE is the policy decision functional entity which may make a preliminary QoS resource decision based on the media flow session information (acquired from SCF through the Rs interface) and user's transport resource subscription information (acquired from NACF through the Ru interface), then interact with the TRC-FE to confirm whether there are sufficient QoS resource, make a final decision, and passes the decision down to PE-FE for enforcement.

The TRC-FE is mainly responsible for resource control, which monitors the resource in the network and collects related information, and responds according to the specific resource conditions when the PD-FE requests resource.

The PE-FE performs policy control (gate control, bandwidth, traffic flow classification and tagging, traffic flow shaping, Layer 2 and Layer 3 QoS mapping, and collecting and reporting resource utilization information, etc) primarily under the direction of the PD-FE.

According to the current description of the TRE-FE protocol, Layer 2 policy enforcement is performed under the direction of the TRC-FE, but neither the specific function nor the scope has been determined.

The resource and admission control system supports the QoS resource control in two modes which are "PULL" mode and "PUSH" mode, in order to adapt to different types of CPEs or Customer Premises Networks (CPNs).

Under the PUSH mode, the SCF requests QoS resource authorization and resource reservation from the resource and admission control system for the service initiated by the Customer Premises Equipment; if the request could be satisfied, the resource and admission control system may actively push the decision to the transport function in order to obtain the corresponding transport resource.

Under the PULL mode, the SCF requests QoS resource authorization and resource reservation from the resource and admission control system for the service initiated by the Customer Premises Equipment; and upon receiving the transport layer signaling message, the transport function may actively request a decision from the resource and admission control system.

The PULL mode is further divided into two types of resource and admission control:

one type requires authorization; the resource and admission control process of this type includes three processes which are Authorization, Reservation and Commitment, where the latter two processes can typically be combined into a single process; authorization is initiated by the CPE and activated by the SCF to generate a request; while Reservation and Commitment are initiated by the CPE and activated by the transport function to generate a resource request;

with the other type, the resource and admission control system configures fixed services for a Customer Premises Equipment with a specific IP address; the resource and admission control process of this type requires no authorization, and the Customer Premises Equipment directly initiates a resource reservation request.

FIGS. 2 and 3 show the flowcharts of the resource and admission control process in the RACF PULL mode that requires no authorization; in the resource and admission control that does require the authorization, before Step 201 or Step 301, the Customer Premises Equipment may still need to first initiate an authorization request to the RACF in order to obtain the authorization; after providing such authorization for the request, the PD-FE may notify the TRC-FE and the PE-FE, and the TRC-FE or the PE-FE may store PD-FE Identifier.

FIG. 2 shows the resource and admission control process activated by the TRE-FE, which includes the following steps:

201, the CPE directly requests resources from the TRE-FE through a path-coupled transport layer signaling message;

the resource request initiated by the CPE may activate the TRE-FE to send a resource request message;

202, the TRE-FE TRC FE sends the resource request message to the TRC-FE;

203, TRC-FE checks the resource request according to the current resource conditions and, if the request is valid, sends a resource decision request message to PD-FE.

FIG. 3 shows the resource and admission control process in the PULL mode activated by the PE-FE, which includes the following steps:

301, the CPE directly requests resources from the PE-FE through a path-coupled transport layer signaling message;

the resource request initiated by the CPE may activate the PE-FE to send a resource decision request message;

302, the PE-FE sends the resource decision request message to the PD-FE.

As shown in FIG. 4, the TRC-FE or the PE-FE has to select the exact PD-FE in Step 203 and Step 302 because the TRC-FE or the PE-FE may interact with multiple PD-FEs. Therefore, for the PULL mode that requires authorization, the exact PD-FE refers to the very PD-FE that authorizes the Customer Premises Equipment during the authorization process; for the PULL mode that requires no authorization, the exact PD-FE refers to the very PD-FE to which the static configuration corresponds. The problem existing in the prior art is that the TRC-FE or the PE-FE can not select the exact PD-FE to implement the resource reservation request process.

SUMMARY

The technical problem that the present invention intends to resolve is providing a method for selecting the PD-FE in the resource and admission control system so that in resource and admission control in the PULL mode, after receiving the resource request initiated by the CPE through the transport layer signaling message, the TRC-FE or the PE-FE may select the exact PD-FE to implement the resource reservation process.

In order to solve the above mentioned problems, the present invention provides a method for selecting policy decision functional entity in the resource and admission control system. The method comprises the following steps:

a Transport Resource Control Function Entity (TRC-FE) or a Policy Enforcement Function Entity (PE-FE) selects a Policy Decision Functional Entity (PD-FE) according to the stored identification information of the PD-FE or according to statically configured PD-FE, if the TRC-FE or the PE-FE is interacting with more than one PD-FEs after the TRC-FE receives a resource request message from a Customer Premises Equipment (CPE) or after the PE-FE receives a transport layer signaling sent by CPE, for resource and admission control in the PULL mode; and the TRC-FE or the PE-FE sends a resource decision request message to the selected PD-FE.

Furthermore, the step of the TRC-FE or the PE-FE selecting a PD-FE according to the stored identification information of the PD-FE or according to the statically configured PD-FE comprises the following steps:

the TRC-FE or the PE-FE determines whether the identification information of the PD-FE for providing authorization for the CPE has been stored, if so, the TRC-FE or the PE-FE may select the PD-FE according to the stored identification information of the PD-FE; otherwise, the TRC-FE or the PE-FE may further determine whether there is statically configured PD-FE, if so, the TRC-FE or the PE-FE may select the PD-FE according to the static configuration.

Furthermore, the method further comprises: the TRC-FE or the PE-FE may send a resource decision request message to all PD-FEs if failing to select a PD-FE; each PD-FE may determine whether the type of service requested in the message is related to it after receiving the resource decision request message, if so, the PD-FE may perform relevant processing.

Furthermore, the method further comprises: the PD-FE may send a resource availability check message to the TRC-FE and send a notification message to the PE-FE while providing an authorization for the CPE, if the PD-FE has provided authorization for the CPE before the CPE initiates a resource request;

the TRC-FE and the PE-FE may store the identification information of the PD-FE and the user information of the CPE after receiving the message.

Furthermore, the method of selecting further comprises that: the statically configured PD-FE refers to the PD-FE which is configured for the TRC-FE or the PE-FE within specific location area.

Furthermore, the method of selecting further comprises that: the statically configured PD-FE refers to the PD-FE which is configured for respect CPE within different ranges of IP address;

while selecting a PD-FE according to the static configuration, the TRC-FE or the PE-FE may select a PD-FE corresponding to the IP address range according to the IP address of the CPE included in the resource request message or in the transport layer signaling.

The present invention also provides a method for selecting policy decision functional entity in the resource and admission control system; for resource and admission control in the PULL mode, the method comprises the following steps:

a Customer Premises Equipment (CPE) initiates a resource initialization request to a Policy Decision Functional Entity (PD-FE) through service control functions (SCF); while providing authorization to the CPE, the PD-FE sends a resource availability check message to a Transport Resource Control Functional Entity (TRC-FE), and sends a notification message to a Policy Enforcement Functional Entity (PE-FE);

the TRC-FE and the PE-FE store the PD-FE identification information and the user information of the CPE after receiving the message;

after the TRC-FE receives a resource request message from the CPE or after the PE-FE receives a transport layer signaling sent by the CPE, the TRC-FE or the PE-FE selects the PD-FE according to the stored identification information of the PD-FE used for providing authorization for the CPE, and sends a resource decision request message to the selected PD-FE.

Furthermore, the method of selecting further comprises that: the TRC-FE or the PE-FE may sent a resource decision request message to all PD-FEs if failing to select a PD-FE; each PD-FE may determine whether the type of service requested in the message is related to it after receiving the resource decision request message, if so, the PD-FE may perform relevant processing.

The present invention further provides a method for selecting policy decision functional entity in the resource and admission control system; for resource and admission control in the PULL mode, the method comprises the following steps:

statically configured PD-FE is stored in a Transport Resource Control Functional Entity (TRC-FE) and a Policy Enforcement Functional Entity (PE-FE);

after the TRC-FE receives a resource request message from a Customer Premises Equipment (CPE) or after the PE-FE receives a transport layer signaling sent by the CPE, the TRC-FE or the PE-FE selects a Policy Decision Functional Entity (PD-FE) according to the static configuration, and sends a resource decision request message to the selected PD-FE.

Furthermore, the method of selecting further comprises that: the statically configured PD-FE refers to the PD-FE which is configured for the TRC-FE or PE-FE within specific location area.

Furthermore, the method of selecting further comprises that: the statically configured PD-FE refers to the PD-FE which is configured for the CPE within different of IP address range;

while selecting a PD-FE according to the static configuration, the TRC-FE or the PE-FE may select the PD-FE corresponding to the IP address range according to the IP address of the CPE included in the resource request message or in the transport layer signaling.

Furthermore, the method of selecting further comprises that: the TRC-FE or the PE-FE may send a resource decision request message to all PD-FEs if failing to select a PD-FE; each PD-FE may determine whether the type of service requested in the message is related to it after receiving the resource decision request message, if so, the PD-FE may perform relevant processing.

With the present invention, the problem in prior art can be resolved that during the resource and admission control process the TRC-FE or the PE-FE can not select the exact PD-FE to which the resource decision request is sent.

DETAILED DESCRIPTION

The present invention is further described below according to the accompanying drawings and specific embodiments.

The main idea of the present invention is: for resource and admission control in the PULL mode, after the TRC-FE receives a resource request message from the CPE or after the PE-FE receives a transport layer signaling sent by the CPE, if the TRC-FE or PE-FE is interacting with more than one PD-FEs, the TRC-FE or the PE-FE may select a PD-FE according to the stored identification information of the PD-FE or according to the statically configured PD-FE, and send a resource decision request message to the selected PD-FE.

Figure 1:
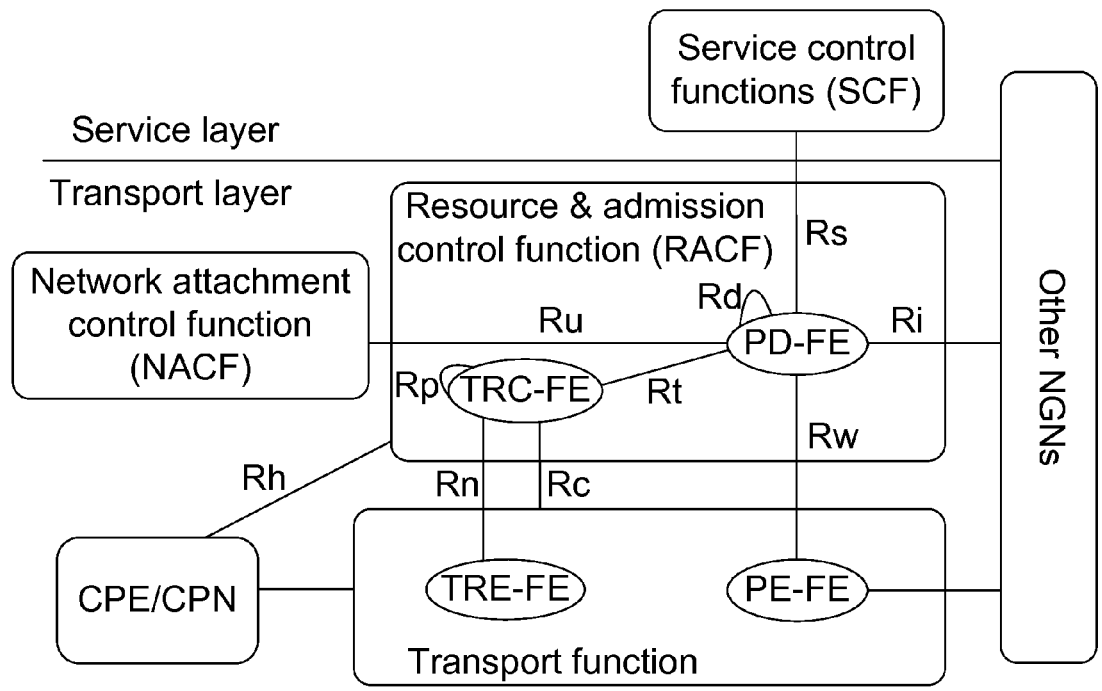
FIG. 1 shows a functional architecture diagram of the RACF of ITU-T.
Figure 2:
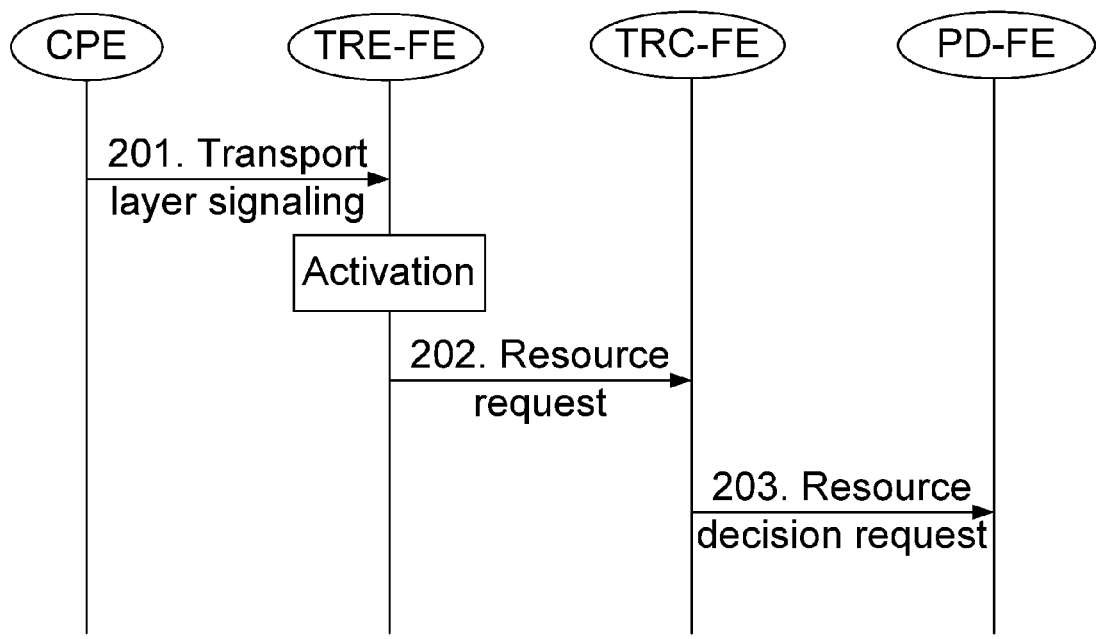
FIG. 2 shows a resource and admission control process in the PULL mode activated by TRE-FE.
Figure 3:
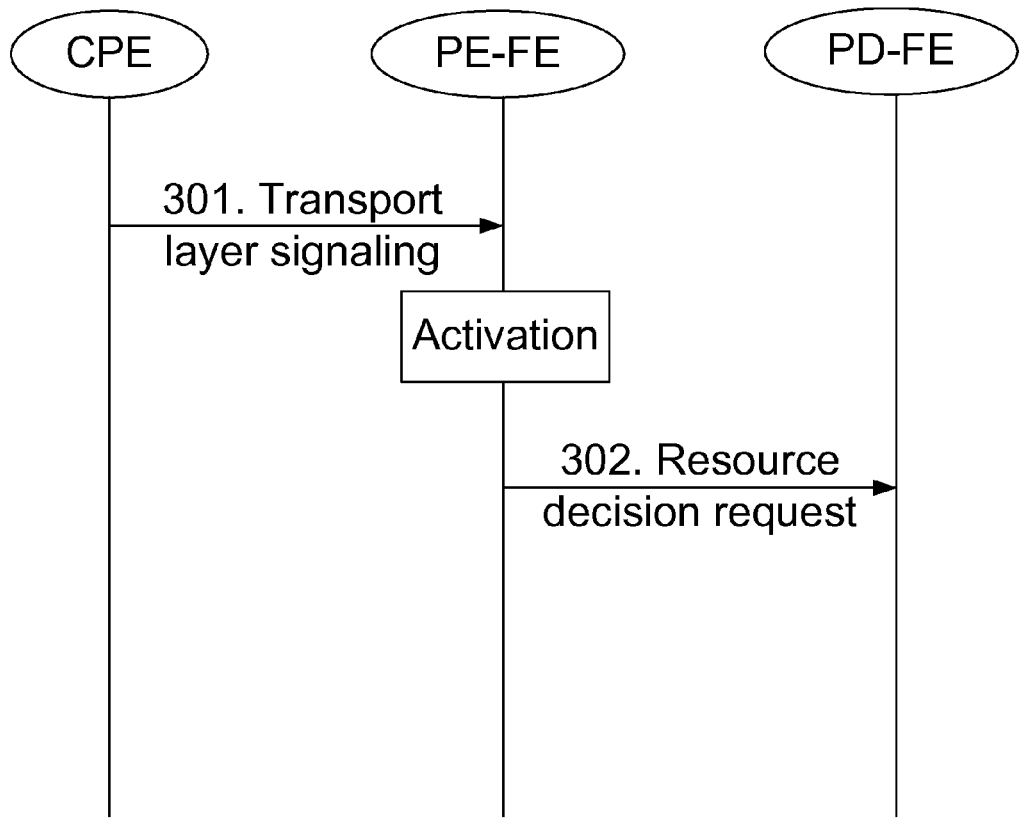
FIG. 3 shows a resource and admission control process in the PULL mode activated by PE-FE.
Figure 4:
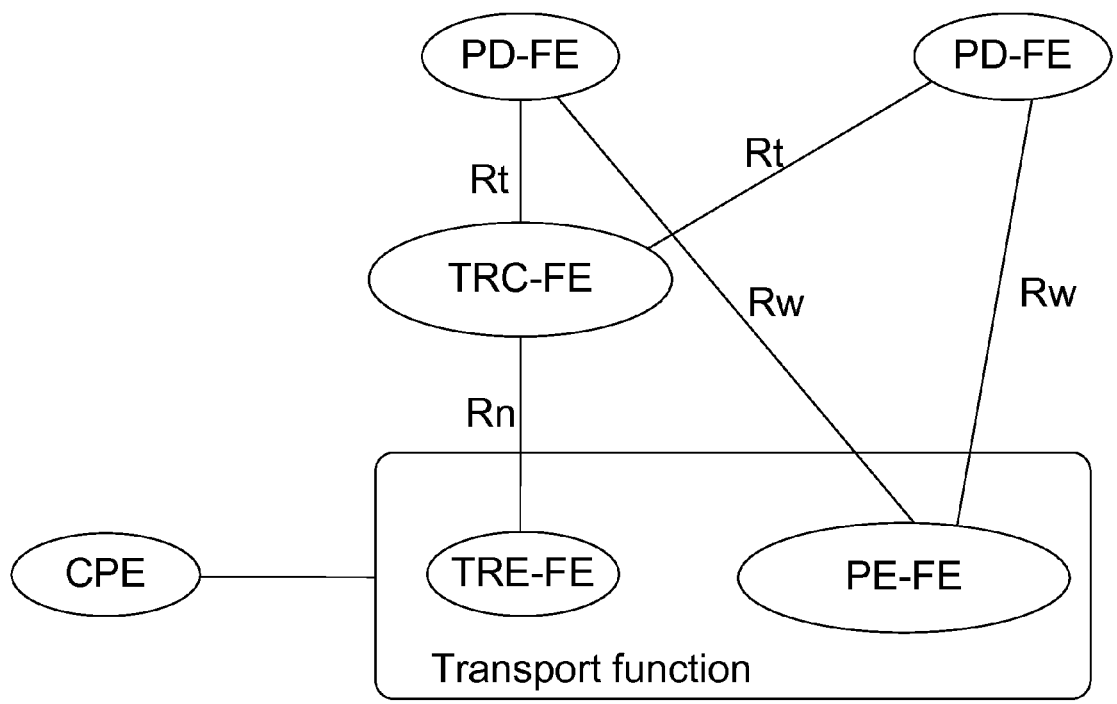
FIG. 4 shows an illustration of interaction between the TRC-FE or the PE-FE and multiple PD-FEs.
Figure 5:
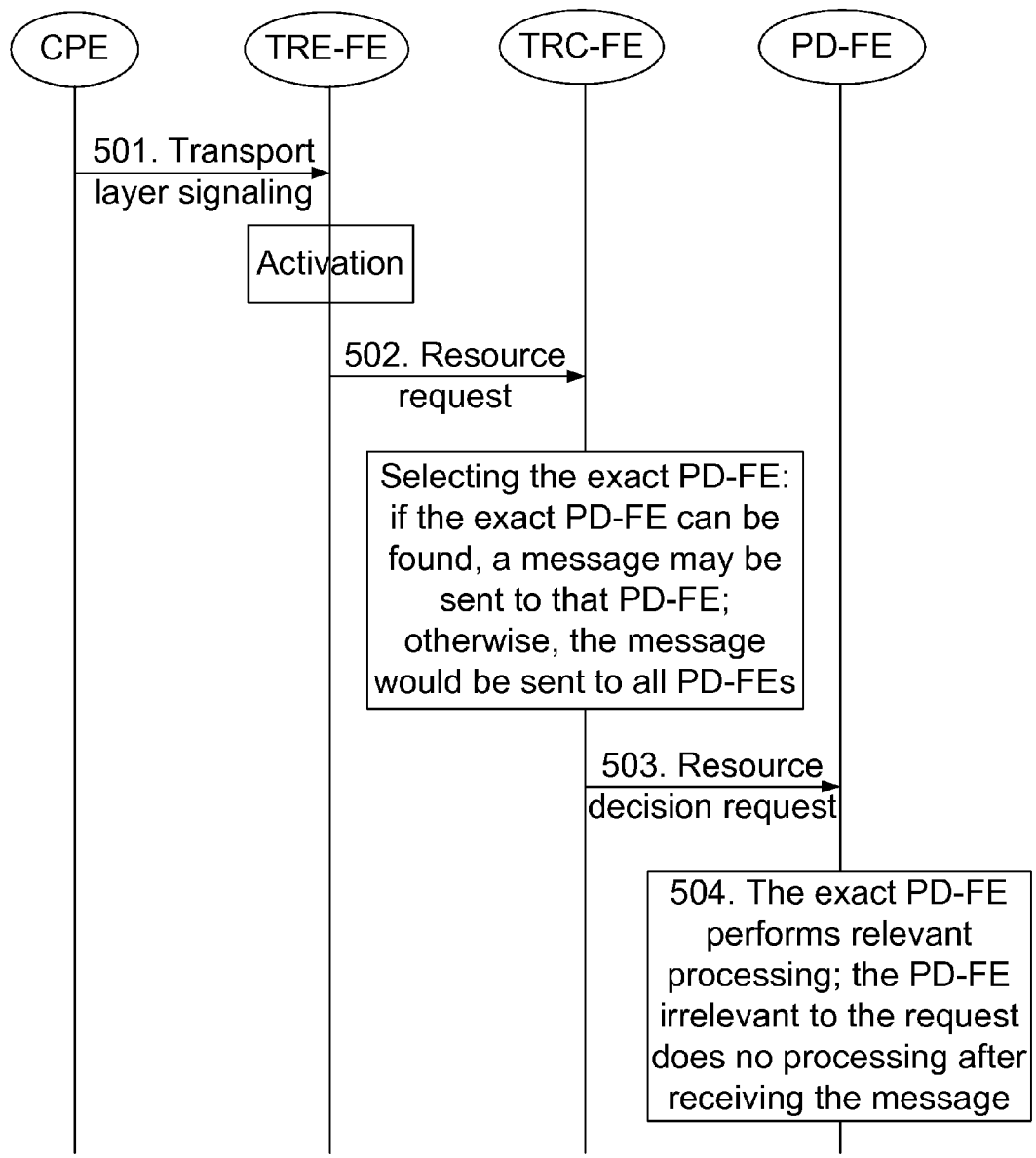
FIG. 5 shows a resource and admission control process where the TRC-FE selects a PD-FE according to an embodiment of the present invention.

FIG. 5 shows a process according to an embodiment of the present invention, during which the TRC-FE sends a resource reservation decision request, includes the following steps:

501, the CPE directly requests resources from the TRE-FE through a path-coupled transport layer signaling message; the resource request initiated by the CPE may activate the TRE-FE to send a resource decision request message.

502, the TRE-FE sends a resource decision request message to the TRC-FE in order to request a corresponding resource policy.

503, the TRC-FE checks the resource decision request according to the current resource conditions and, if the request is valid, selects the exact the PD-FE and sends a resource decision request message to the selected PD-FE;

the TRC-FE may interact with multiple PD-FEs, therefore the process depends on several situations as follows:

503-1: if the TRC-FE interacts with only one PD-FE, the TRC-FE may directly send the resource decision request message to the PD-FE;

503-2: if the TRC-FE interacts with multiple PD-FEs, the TRC-FE may first determine whether the PD-FE identifier corresponding to the CPE has been stored during the authorization stage, if so, the TRC-FE may select a PD-FE according to the stored PD-FE identifier, and send a resource decision request message to the selected PD-FE; otherwise, the TRC-FE may further determine whether there is statically configured PD-FE, if so, the TRC-FE may select a PD-FE according to the static configuration, and send a resource decision request message to the selected PD-FE;

in Step 503-2, it is also practical to determine whether there is statically configured PD-FE first;

if the CPE has passed the authorization stage before, during the authorization stage, the PD-FE may notify the TRC-FE of the authorization information, for example, when performing authorization to the CPE, the PD-FE may send a resource availability check message to the TRC-FE, and the PD-FE may also send a notification message to the PE-FE; the message contains relevant information of the PD-FE (such as the PD-FE identifier) and user information of the authorized CPE, and the TRC-FE (and PE-FE) may store the user information of CPE and the relevant information of the corresponding PD-FE (i.e. which had performed authorization to the CPE); in this way, during the subsequent "reservation" and "commitment" stages, the TRC-FE (or the PE-FE) may be able to locate the exact PD-FE according to the stored information;

if there is no authorization stage before, the TRC-FE may determine whether there is statically configured PD-FE, if so, TRC-FE may select a PD-FE according to the static configuration, and send a resource decision request message to the selected PD-FE; static configuration means that: the corresponding configuration has been made before the interaction between the TRC-FE and the PD-FE, for example, the TRC-FE within specific location area can only interact with the prescribed PD-FE, when receiving a request sent by the transport device, the TRC-FE may simply send the message to the prescribed PD-FE; or the corresponding configuration has been made according to the IP address of the CPE, i.e. different PD-FE may process requests within different range of IP address so that the TRC-FE may simply send the message to the corresponding PD-FE according to the IP address information included in the request message;

503-3: if the TRC-FE fails to select the exact PD-FE, the TRC-FE may send the request message to all PD-FEs interacting with it.

504, after receiving the request message, the PD-FE may determine whether the message is related to it according to the information such as the type of service requested, if so, the PD-FE may perform the relevant processing, otherwise, PD-FE may not perform any processing.

Figure 6:
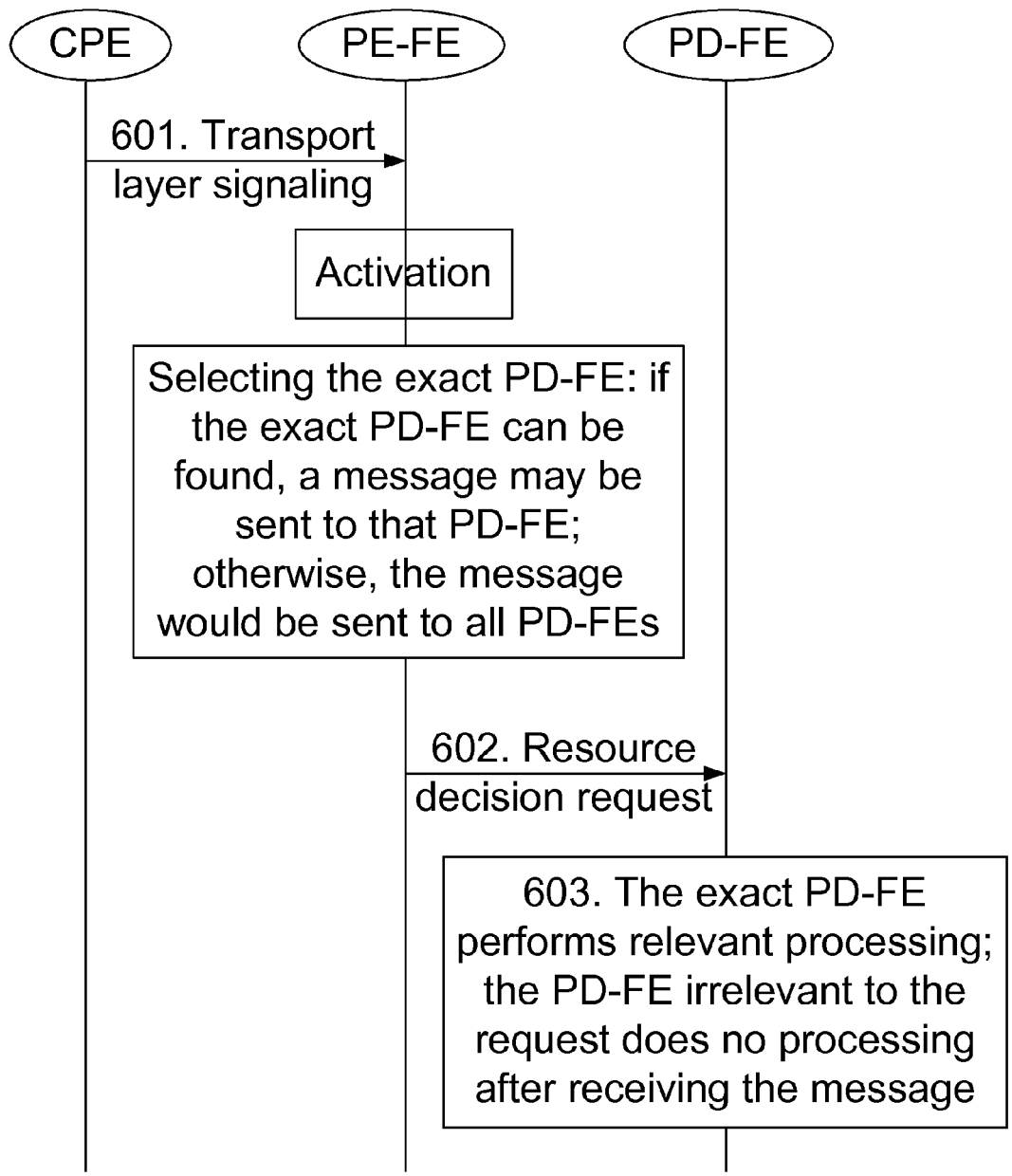
FIG. 6 shows a resource and admission control process where the PE-FE selects a PD-FE according to an embodiment of the present invention.

FIG. 6 shows a process according to an embodiment of the present invention, during which the PE-FE sends a resource reservation decision request, including the following steps:

601, the CPE directly requests resources from the PE-FE through a path-coupled transport layer signaling message, and the resource request initiated by the CPE may activate the PE-FE to send a resource request message;

602, the PE-FE selects the exact PD-FE and sends a resource decision request message to the exact PD-FE in order to request the corresponding resource policy;

method of selecting of Step 503 can be applied by Step 602, for the specific process, please refer to the description in Step 503, which is not repeated here;

603, after receiving the request message, the PD-FE may determine whether the message is related to it, if so, the PD-FE may perform the relevant processing, otherwise, the PD-FE may not perform any processing.

The above-mentioned are only embodiments of the present invention and are not intended to limit the present invention. For those skilled in the art, the present invention may have various changes and modifications. Any modification and equivalent substitution without departing from the spirit and principle of the present invention is included in the disclosure of the protection. Therefore, the scope of protection of the present invention should be based on the scope of protection in the claims.

INDUSTRIAL APPLICABILITY

With the present invention, in resource and admission control in the PULL mode, after receiving the resource request initiated by the CPE through the transport layer signaling message, the TRC-FE or the PE-FE may select the exact PD-FE to implement the resource reservation process, thereby resolving the problem in prior art that during the resource and admission control process the TRC-FE or the PE-FE can not select the exact PD-FE to which the resource decision request is sent.

What is claimed is:

1. A method for selecting policy decision functional entity in the resource and admission control system, comprising:
receiving at a Transport Resource Control Function Entity (TRC-FE) a resource request message from a Customer Premises Equipment (CPE), or receiving at a Policy Enforcement Function Entity (PE-FE) a transport layer signaling sent by the CPE, for resource and admission control in PULL mode;
determining, by the TRC-FE or the PE-FE, whether identification of a Policy Decision Functional Entity (PD-FE) that has provided authorization for the CPE has been stored in the TRC-FE or the PE-FE, when the TRC-FE or the PE-FE is interacting with more than one PD-FEs;
selecting, by the TRC-FE or the PE-FE, the PD-FE that has provided authorization for the CPE when the identification information of the PD-FE has been stored;
selecting, by the TRC-FE or the PE-FE, a statically configured PD-FE when no identification information of the PD-FE has been stored; and
sending a resource decision request message from the TRC-FE or the PE-FE to the selected PD-FE.

2. The method according to claim 1, further comprising:
sending, by the TRC-FE or the PE-FE, the resource decision request message to all PD-FEs if failing to select a PD-FE;
determining, by each PD-FE, whether a type of service requested in the resource decision request message is related to it after receiving the resource decision request message, if so, performing relevant processing.

3. The method according to claim 1, further comprising:
sending, by the PD-FE, a resource availability check message to the TRC-FE and a notification message to the PE-FE while providing an authorization for the CPE, if the PD-FE has provided authorization for the CPE before the CPE initiates a resource request;
storing, by the TRC-FE and PE-FE, the identification information of the PD-FE and the user information of the CPE after receiving the message.

4. The method according to claim 1, wherein,
the statically configured PD-FE refers to the PD-FE which is configured for the TRC-FE or the PE-FE within specific location area.

5. The method according to claim 1, wherein, the statically configured PD-FE refers to the PD-FE which is configured for the CPE within different IP address range;
while selecting a PD-FE according to the static configuration, the TRC-FE or the PE-FE selects the PD-FE corresponding to the IP address range according to the IP address of the CPE included in the resource request message or in the transport layer signaling.

6. A method for selecting policy decision functional entity in the resource and admission control system, for resource and admission control in the PULL mode, the method comprising:
initiating, by a Customer Premises Equipment (CPE), a resource initialization request to a Policy Decision Functional Entity (PD-FE) through service control functions (SCF);
sending, by the PD-FE, a resource availability check message to a Transport Resource Control Functional Entity (TRC-FE), and a notification message to a Policy Enforcement Functional Entity (PE-FE), when the PD-FE provides authorization to the CPE;
storing, by the TRC-FE and the PE-FE, identification information of the PD-FE and user information of the CPE after receiving the message;
receiving at the TRC-FE a resource request message from the CPE, or receiving at the PE-FE a transport layer signaling sent by the CPE; and
selecting, by the TRC-FE or the PE-FE, the PD-FE according to the stored identification information of the PD-FE and sending a resource decision request message to the selected PD-FE.

7. The method of selecting according to claim 6, further comprising:
sending, by the TRC-FE or the PE-FE, the resource decision request message to all PD-FEs if failing to select a PD-FE;
determining, by each PD-FE, whether a type of service requested in the resource decision request message is related to it after receiving the resource decision request message, if so, performing relevant processing.

* * * * *

UNITED STATES PATENT AND TRADEMARK OFFICE
CERTIFICATE OF CORRECTION

PATENT NO.       : 8,381,261 B2
APPLICATION NO.  : 12/865130
DATED            : February 19, 2013
INVENTOR(S)      : You et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 251 days.

Signed and Sealed this
First Day of September, 2015

Michelle K. Lee
*Director of the United States Patent and Trademark Office*